United States Patent [19]

Balling

[11] Patent Number: 5,555,063
[45] Date of Patent: Sep. 10, 1996

[54] CAMERA WITH BUILT-IN MEANS FOR CLOSING FILM CASSETTE AND EJECTING CLOSED CASSETTE

[75] Inventor: Edward N. Balling, Rochester, N.Y.

[73] Assignee: Eastman Kodak Company, Rochester, N.Y.

[21] Appl. No.: 407,991

[22] Filed: Mar. 21, 1995

[51] Int. Cl.⁶ .................................................. G03B 17/02
[52] U.S. Cl. ............................................................ 354/288
[58] Field of Search .............................. 354/21, 275, 288

[56] References Cited

U.S. PATENT DOCUMENTS 5,049,914  9/1991  Dassero ................................. 354/288
5,231,438  7/1993  Smart ..................................... 354/281
5,323,201  6/1994  Richiuso et al. ....................... 354/288
5,357,303  10/1994  Wirt ...................................... 354/275
5,359,378  10/1994  Zander et al. ......................... 354/275

FOREIGN PATENT DOCUMENTS 6-130557A  5/1994  Japan .
6-130558A  5/1994  Japan .

Primary Examiner—David M. Gray
Attorney, Agent, or Firm—Roger A. Fields

[57] ABSTRACT

A camera comprising a cassette-receiving chamber for holding a film cassette provided with a light lock which is to be completely closed before removing the cassette from the chamber, is characterized by built-in ejection means for forcibly ejecting the cassette from the chamber only when the light lock is completely closed.

9 Claims, 5 Drawing Sheets

CAMERA WITH BUILT-IN MEANS FOR CLOSING FILM CASSETTE AND EJECTING CLOSED CASSETTE

CROSS-REFERENCE TO RELATED APPLICATION(S)

Reference is made to commonly assigned copending application Ser. Nos. 08/371,336, entitled APPARATUS AND METHOD FOR CLOSING A FILM CASSETTE AND UNLOADING THE CLOSED CASSETTE FROM A CAMERA and filed Jan. 11, 1995 in the names of David C. Smart and Thomas E. Dussinger, Ser. No. 08/407,835 entitled CAMERA WITH BUILT-IN MEANS FOR CLOSING FILM CASSETTE AND TEARING OPEN CAMERA TO REMOVE CLOSED CASSETTE and filed Mar. 21, 1995 in the name of Edward N. Balling, and Ser. No. 08/407,992 entitled CAMERA WITH FILM SENSOR FOR CLOSING CASSETTE WHEN FILMSTRIP WOUND COMPLETELY INTO CASSETTE and filed Mar. 21, 1995 in the name of Edward N. Balling.

FIELD OF THE INVENTION

The invention relates generally to the field of photography, and in particular to a camera with a built-in mechanism for closing a light lock of a film cassette inside the camera and ejecting the closed cassette from the camera.

BACKGROUND OF THE INVENTION

Film and cameras that are all in one, commonly referred to as single-use or one-time-use cameras, have recently become well known. Typically, the one-time-use camera is a simple point-and-shoot type comprising a plastic, inner, main body part which supports a fixed-focus taking lens, a film metering mechanism with a rotatably supported metering sprocket, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear cover parts often house the main body part between them to complete the camera assembly, and the rear cover part connects to the main body part and/or to the front cover part to make the main body part light-tight. A decorative cardboard outer box contains the camera assembly and has respective openings for the taking lens, the shutter release button, the film advance thumbwheel, the viewfinder, the frame counter, and a flash emission window.

Typically, during original manufacture or recycling (remanufacture) of the one-time-use camera, a conventional light-trapping film cassette with a 35 mm filmstrip having a film leader protruding from the cassette shell, and a film take-up spool to which a leading end of the protruding film leader is attached, are placed in respective chambers in the main body part. The protruding film leader is positioned over the metering sprocket to place one of a longitudinal series of edge perforations in the leader onto one of an annular series of peripheral teeth on the metering sprocket in order to engage the leader to the metering sprocket. Then, the rear cover part is fitted to the main body part to prevent the protruding film leader from becoming separated from the metering sprocket, and as disclosed in prior art U.S. Pat. No. 4,972,649, issued Nov. 27, 1990, an exposed end of the film take-up spool is rotated to factory prewind substantially the entire length of the unexposed filmstrip from the cassette shell onto the take-up spool. Lastly, the outer box is placed on the camera assembly.

After the photographer takes a picture with the one-time-use camera, he or she manually rotates the thumbwheel to rotate a cassette spool inside the cassette shell to rewind the exposed frame into the cassette shell. The rewinding movement of the filmstrip the equivalent of slightly more than one frame width rotates the metering sprocket, which is in engagement with the filmstrip, to decrement the frame counter to its next lower-numbered setting. When the maximum number of exposures available on the filmstrip are exposed and the filmstrip is completely rewound into the cassette shell, the one-time-use camera is given to a photofinisher who tears the outer box off the camera unit, separates the rear cover part from the main body part, and removes the film cassette with the filmstrip from the main body part. Then, he removes the filmstrip from the cassette shell to develop the negatives and make prints for the customer, and he forwards the used camera parts to the manufacturer for recycling.

As contrasted with the conventional light-trapping film cassette, prior art U.S. Pat. No. 5,357,303, issued Oct. 18, 1994, discloses a new-type film cassette having a light lock which is pivoted closed to prevent ambient light from entering the cassette interior and is pivoted open to permit film movement out of and into the cassette interior. An implement or tool is designed to engage the light lock to pivot it open and closed.

Prior art U.S. Pat. No. 5,231,438, issued Jul. 27, 1993, discloses a camera intended for use with the new-type film cassette having a light lock which is pivoted closed to prevent ambient light from entering the cassette interior and is pivoted open to permit film movement out of and into the cassette interior. The camera has a release button which when manually moved in a releasing direction actuates a latching device. The latching device normally secures a door closed over a chamber holding the film cassette. However, when the latching device is actuated, it operates to pivot the light lock closed and to release the door to uncover the chamber.

The Cross-Referenced Application

Cross-referenced application Ser. No. 08/371,336 discloses a camera comprising a cassette-receiving chamber for holding a film cassette provided with a light lock which is pivoted closed before removing the cassette from the chamber. An exterior opening to the chamber is positioned to longitudinally admit an implement into the chamber for rotation to pivot the light lock closed and to further admit the implement into the chamber to push the cassette out of the chamber. A latch securing a lid closed over the chamber is engageable with the light lock to be moved to release the lid when the light lock is pivoted open. The lid, when released, is hingedly supported to allow the cassette to push the lid open as the cassette is pushed out of the chamber.

SUMMARY OF THE INVENTION

A camera comprising a cassette-receiving chamber for holding a film cassette provided with a light lock which is to be completely closed before removing the cassette from the chamber, is characterized by:

built-in ejection means for forcibly ejecting the cassette from the chamber only when the light lock is completely closed.

More particularly, a main body part defines the chamber, and a lid is interlocked with the main body part to be held fast to the main body part at least partially covering the chamber but to allow the cassette to forcibly separate or pop-out the lid from the main body part when the cassette is forcibly ejected from the chamber.

DETAILED DESCRIPTION OF THE INVENTION

Figure 1:
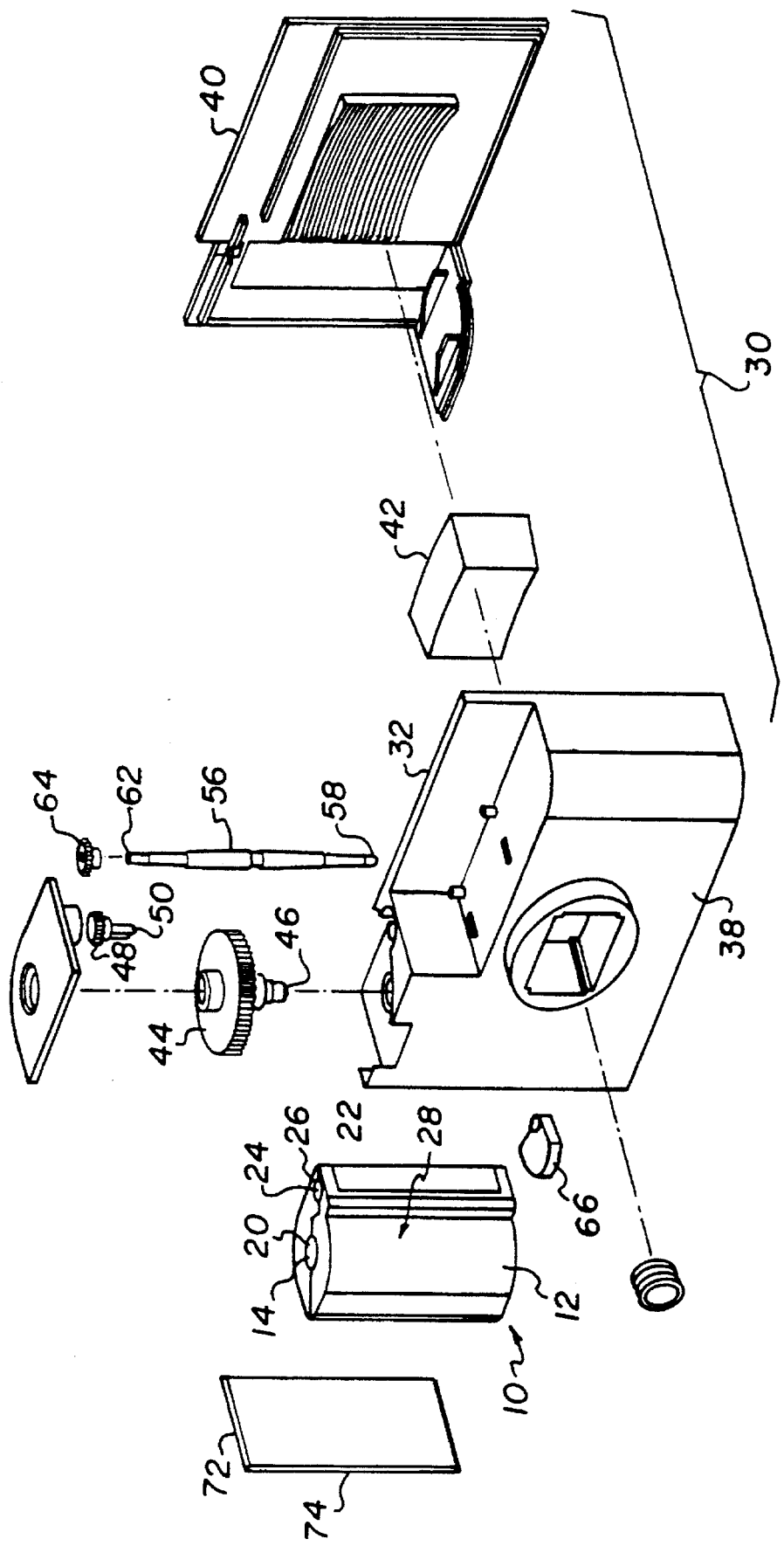
FIG. 1 is an exploded front perspective view of a camera according to a preferred embodiment of the invention and of a film cassette to be loaded into the camera.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1, 2, 6, and 7 show a film cassette 10 similar in operation to ones disclosed in prior art U.S. Pat. No. 5,357,303, issued Oct. 18, 1994, and 5,231,438, issued Jul. 27, 1993. The film cassette 10 comprises a cassette shell 12 housing a flanged spool 14 on which is stored a wound filmstrip 16 provided with an integral film leader 18. The cassette spool 14 has opposite exposed ends located in respective end holes 20 in the cassette shell 12 to support the spool for rotation. A light lock 22 has an integral shaft 24 which is supported at opposite exposed ends in respective end holes 26 in the cassette shell 12 to be pivoted open to uncover a film egress/ingress slot 28 in the cassette shell and to be pivoted closed to prevent ambient light from entering the shell interior through the slot.

Figure 3:
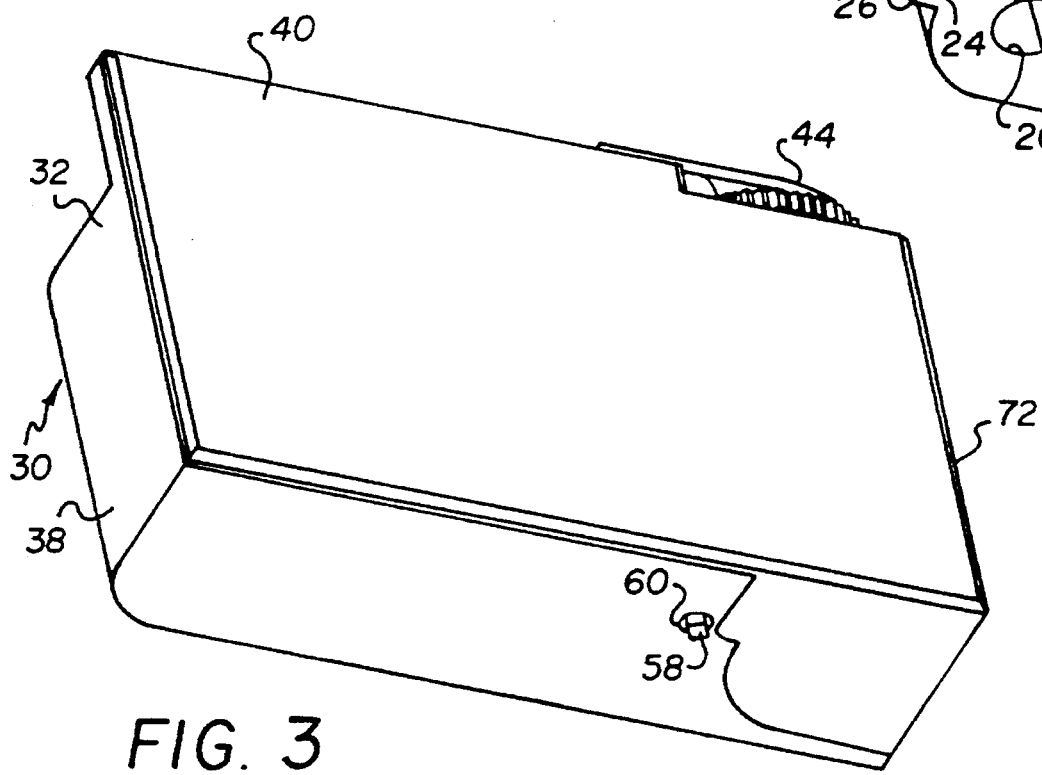
FIG. 3 is a rear bottom perspective view of the assembled front cover part, main body part, and rear cover part of the camera.
Figure 4:
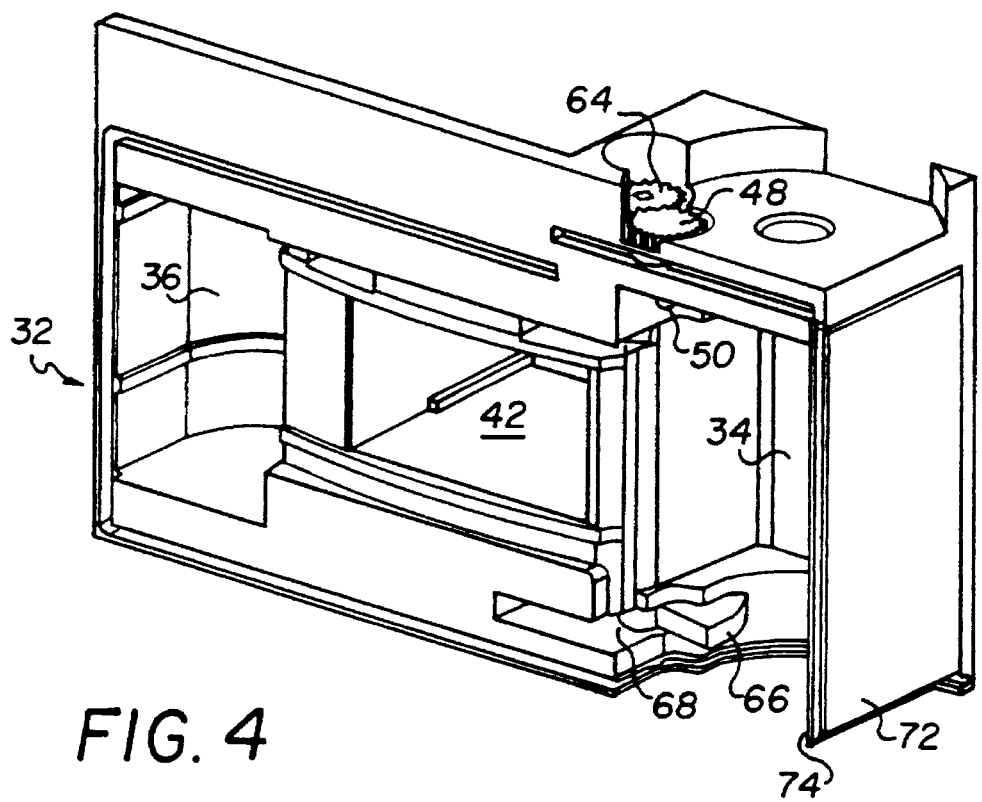
FIGS. 4 and 5 are top and bottom rear perspective views of the assembled front cover part and main body part of the camera, shown with the rear cover part omitted to illustrate a cassette ejection kicker supported in the main body part.

As shown in FIG. 1, a one-time-use camera 30 with which the film cassette 10 is to be used comprises a main body part 32 that defines a cassette-receiving chamber 34 and a separate unexposed film roll chamber 36, and a pair of front and rear cover parts 38 and 40 that house the main body part between them to complete the camera assembly. A backframe opening 42 at which successive sections of the filmstrip 16 are to be exposed is located between the cassette-receiving chamber 34 and the unexposed film roll chamber 36. A film advance thumbwheel 44 rotatably supported on the main body part 32 has a depending coaxial projection 46 which protrudes into the cassette-receiving chamber 34 to engage one end of the cassette spool 14 in order to rotate the spool in a winding direction to wind each exposed section of the filmstrip 16 into the cassette shell 12 following its exposure. A toothed closure gear 48 rotatably supported on the main body part 32 has a depending coaxial projection 50 which protrudes into the cassette-receiving chamber 34 to engage one end of the integral shaft 24 of the light lock 22 in order to pivot the light lock in opposite directions to open and close the film egress/ingress slot 28 in the cassette shell 12. See FIGS. 2–4.

Figure 2:
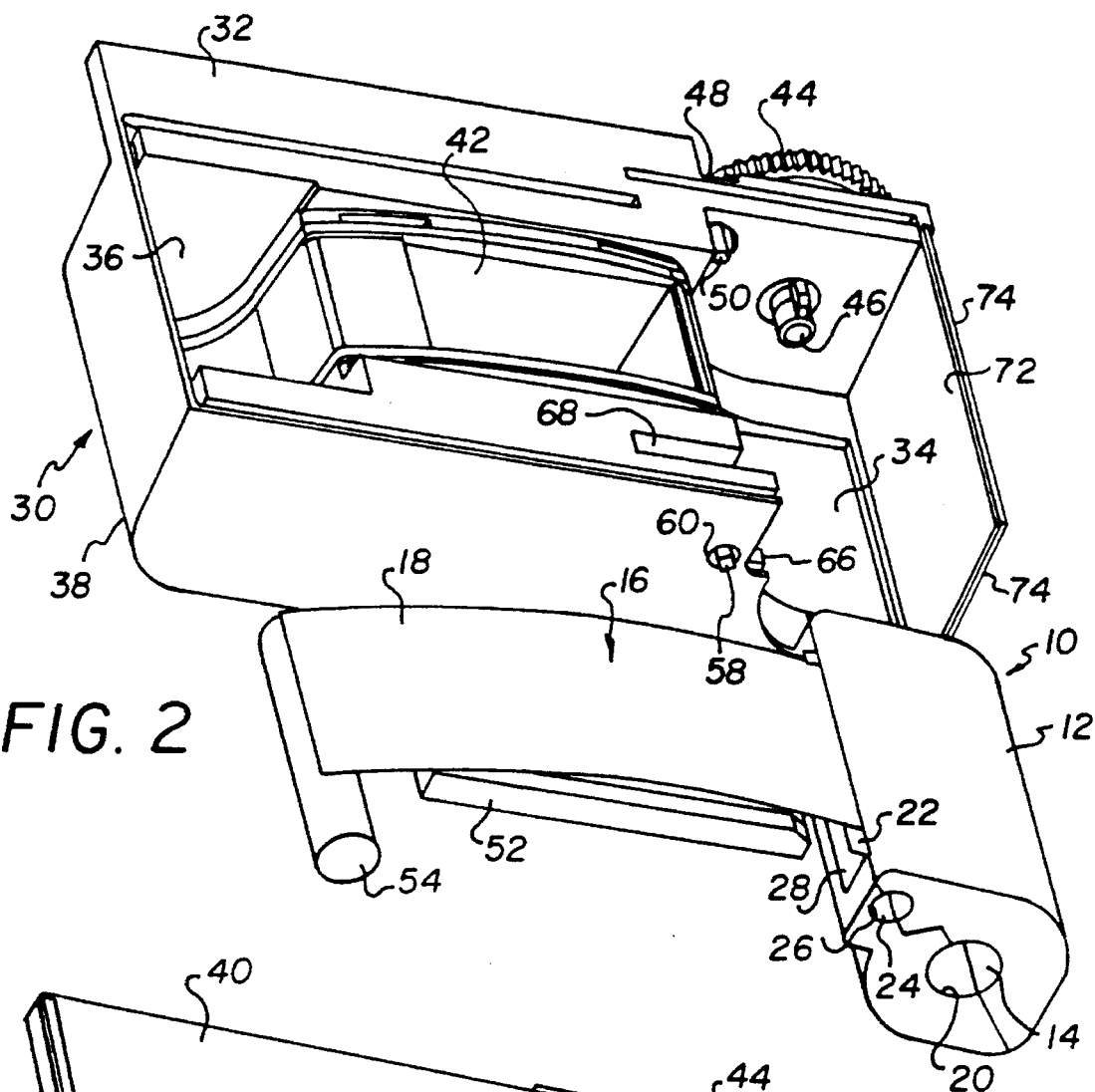
FIG. 2 is a rear bottom perspective view of an assembled front cover part and main body part of the camera and of the film cassette, shown with a rear cover part omitted and the film cassette being readied to be loaded into the main body part.

During original manufacture or recycling (remanufacture) of the one-time-use camera 30, the light lock 22 is opened and most of the unexposed filmstrip 16 beginning with its film leader 18 is prewound in the dark from the cassette shell 12, over a fixture 52, and into an unexposed film roll about a prewinder 54 as shown in FIG. 2. Then, the film cassette 10 and the unexposed film roll (with a film section extending between the two) are placed in the cassette-receiving and unexposed film roll chambers 34 and 36, and the rear cover part 40 is attached to the main body part 32. See FIG. 3.

Figure 5:
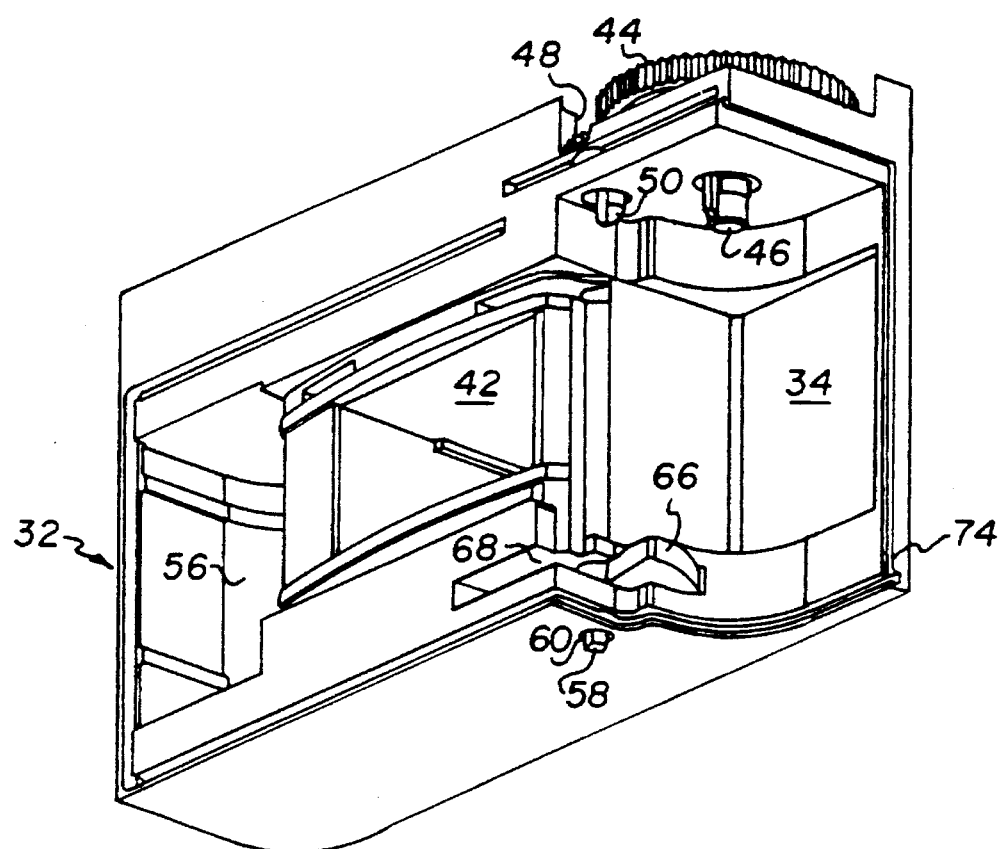
Figure 6:
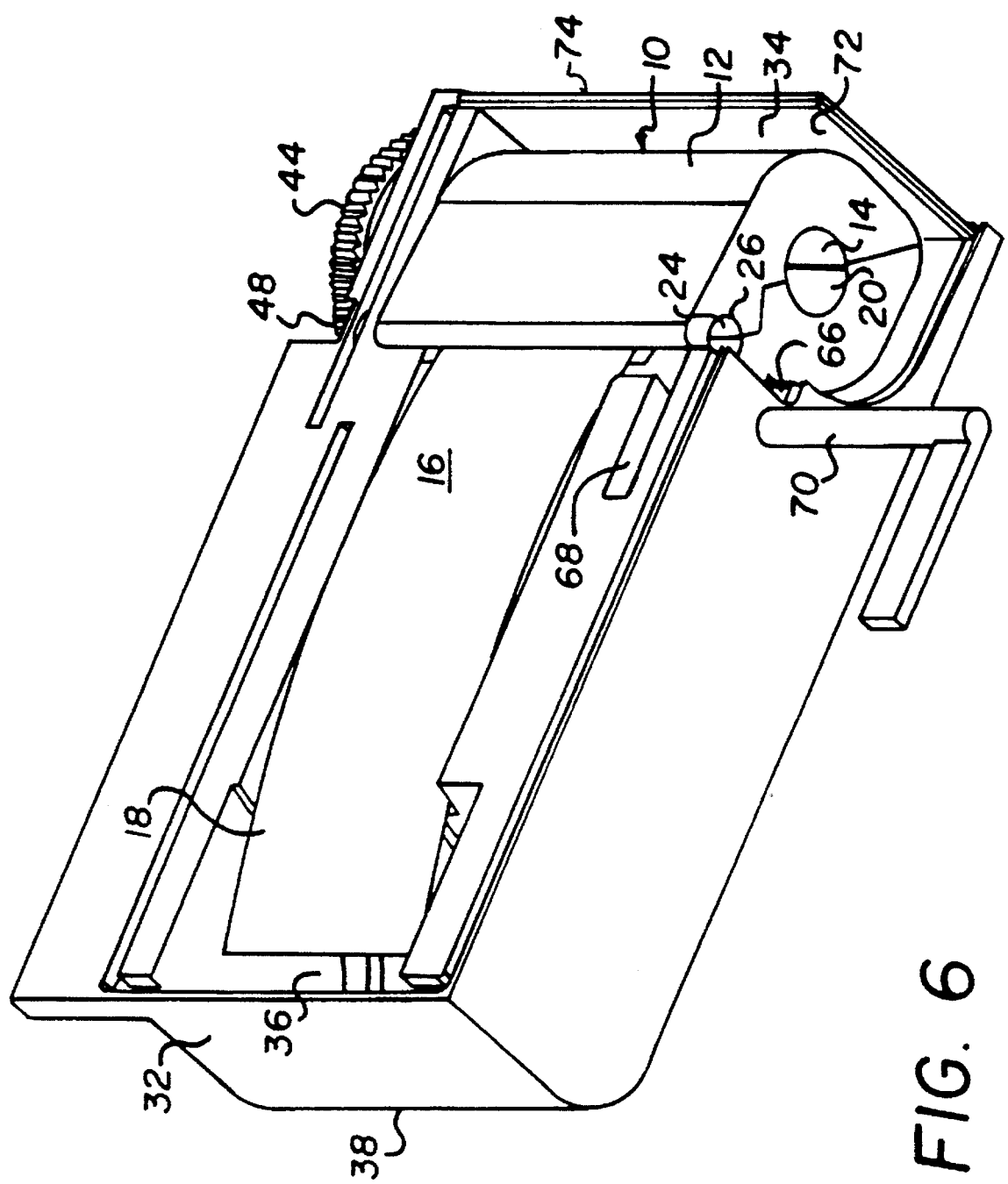
FIGS. 6 and 7 are rear bottom perspective view of the assembled front cover part and main body part of the camera and of the film cassette, shown with the rear cover part omitted to illustrate movement of the cassette ejection kicker from a retracted position in FIG. 6 to an ejecting position in FIG. 7.
Figure 7:
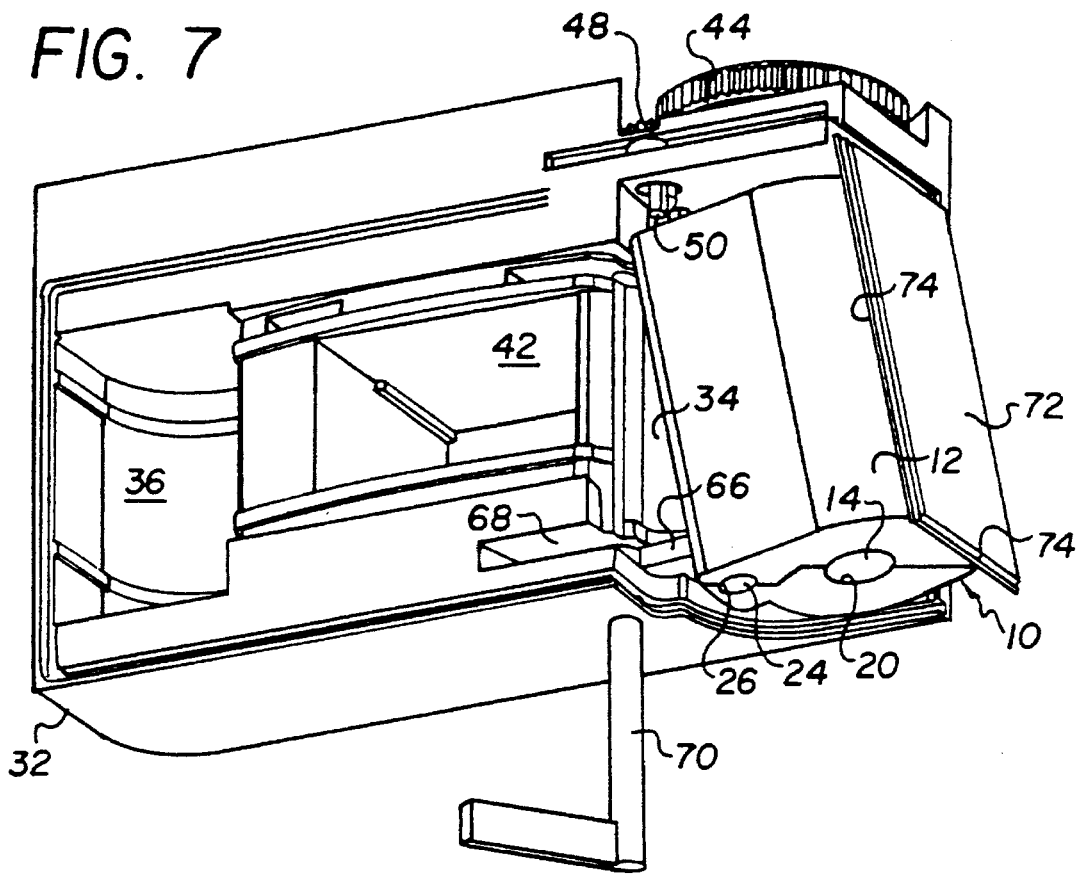
Figure 8:
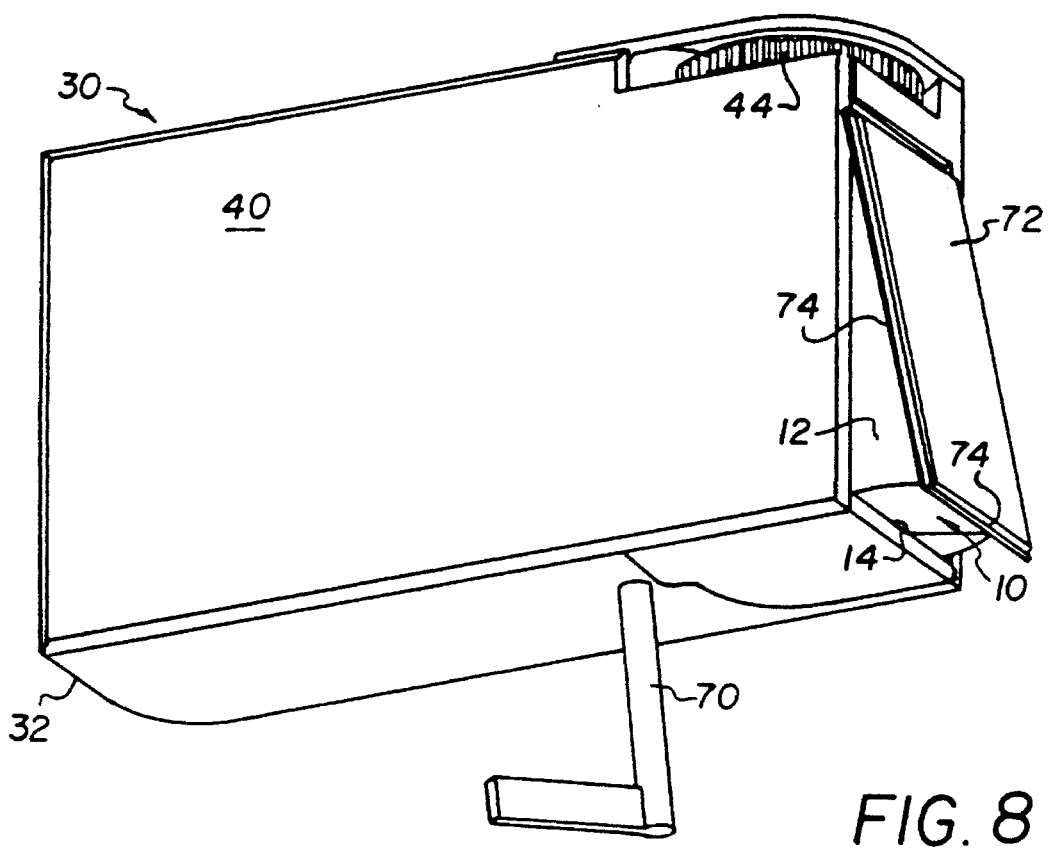
FIG. 8 is a rear bottom perspective view of the assembled front cover part, main body part, and rear cover part of the camera, shown with the film cassette being ejected from the main body part.

After all of the available sections of the filmstrip 16 have been exposed at the backframe opening 42 and the filmstrip including its film leader 18 is wound completely into the cassette shell 12, the light lock 22 is to be closed and the film cassette 10 is to be removed from the cassette-receiving chamber 34. In this connection, there is provided a shaft 56 rotatably supported on the main body part 32 which has one end 58 accessible at a bottom opening 60 in the main body part 32 and another end 62 coaxially fixed to a toothed motion transfer gear 64 in mesh with the closure gear 48. See FIGS. 1, 4, and 5. A cassette ejection kicker 66 is fixed to the shaft 56 for pivoting in opposite directions between a retracted position substantially in a cavity 68 adjoining the cassette-receiving chamber 34, shown in FIGS. 2 and 6, and a cassette ejecting position substantially in the chamber, shown in FIGS. 4, 5, and 7, as the shaft is rotated in opposite directions. In operation, a manual rotation tool 70 is engaged with the exposed end 58 of the shaft 56 and rotated in a counter-clockwise direction in FIGS. 6 and 7 to similarly rotate the shaft. During the first 60 degrees of rotation of the shaft 56, the motion transfer gear 64 rotates the closure gear 48 to begin to close the light lock 22 and to pivot the ejection kicker 66 from its retracted position but not yet to its ejecting position. However, if any section of the filmstrip 16 is protruding from the film egress/ingress slot 28, the light lock 22 is blocked from being completely closed and the operation will be stalled. Conversely, if the filmstrip 16 is wound completely into the cassette shell 12, the shaft 56 is rotated another 15 degrees to close the light lock 22 completely and to continue to pivot the ejection kicker 66 from its retracted position but not yet to its ejecting position. Then, the shaft 56 is forcibly rotated another 15 degrees to fracture the meshing teeth of the motion transfer and closure gears 64 and 48 (because the light lock 22 is completely closed) and to pivot the ejection kicker 66 finally to its ejecting position. When the ejection kicker 66 is pivoted to its ejecting position as shown in FIGS. 7 and 8, it pushes the film cassette 10 against an end lid 72 which is interlocked with the main body part 32 and the rear cover part 40 via a known tongue-and groove connection 74, forcibly disconnecting the end lid from the main body part and the rear cover part and allowing the film cassette to be ejected from the cassette-receiving chamber.

The invention has been described with reference to a preferred embodiment. However, it will be appreciated that variations and modifications can be effected by a person of ordinary skill in the art without departing from the scope of the invention.

PARTS LIST 10. film cassette
12. cassette shell
14. cassette spool
16. filmstrip
18. film leader
20. cassette end hole
22. cassette light lock
24. light lock shaft
26. cassette end hole
28. film egress/ingress slot
30. one-time-use camera
32. main body part
34. cassette-receiving chamber
36. unexposed film roll chamber
38. front cover part
40. rear cover part
42. backframe opening
44. film advance thumbwheel
46. thumbwheel coaxial projection
48. closure gear
50. gear coaxial projection
52. fixture
54. prewinder
56. shaft
58. shaft exposed end
60. main body part bottom opening
62. shaft other end
64. motion transfer gear
66. ejection kicker
68. cavity
70. rotation tool
72. lid
74. tongue-and-groove connection

I claim:

1. A camera comprising a cassette-receiving chamber for holding a film cassette provided with a light lock which is to be completely closed before removing the cassette from said chamber, is characterized by:

built-in ejection means for ejecting the cassette from said chamber when the light lock is closed;

closure means movable in engagement with the light lock to close the light lock; and coordination means connects said ejection means and said closure means for allowing the ejection means to eject the cassette from said chamber when the closure means closes the light lock.

2. A camera as recited in claim 1, wherein a main body part defines said chamber, and a lid is interlocked with said main body part to be held fast to the main body part at least partially covering said chamber but to allow the cassette to forcibly disconnect the lid from the main body part when the cassette is forcibly ejected from the chamber.

3. A camera as recited in claim 2, wherein said main body part has a top and bottom and a pair of opposite ends, and said lid is interlocked with said main body part at one of said opposite ends.

4. A camera as recited in claim 1, wherein said closure means includes a closure gear having a coaxial projection for engaging the light lock and being rotatable to completely close the light lock, said coordination means includes a shaft having one end accessible from outside said camera to rotate said shaft and another end coaxially fixed to a motion transfer gear in mesh with said closure gear to rotate the closure gear to completely close the light lock, and said ejection means includes an ejection kicker connected to said shaft to swing against the cassette to forcibly eject the cassette from said chamber as the shaft is rotated.

5. A camera as recited in claim 4, wherein said ejection kicker is connected to said shaft to be swung against the cassette after said closure gear is rotated to completely close the light lock, and said closure gear and said motion transfer gear are adapted to fracture when said shaft is rotated after the light lock is completely closed.

6. A camera as recited in claim 4 wherein said ejection kicker is connected to said shaft to swing from a retracted position substantially removed from said chamber to an ejecting position protruding into the chamber.

7. A camera as recited in claim 1, wherein said ejection means includes an ejection kicker supported for movement from a retracted position substantially removed from said chamber to an ejecting position protruding into the chamber.

8. A camera as recited in claim 7, wherein manually operable means accessible from outside said camera means is connected to said ejection kicker to be manually operated to move the ejection kicker from its retracted position to its ejecting position.

9. A camera comprising a cassette-receiving chamber for holding a film cassette provided with a light lock which is to be closed before removing the cassette from said chamber, is characterized by:

a main body part defining said chamber;

a lid interlocked with said main body part to be held fast at least partially covering said chamber but to allow said lid to be forcibly disconnected from the main body part; and a built-in ejection kicker actuatable to push the film cassette against said lid to forcibly disconnect said lid from said main body part when the light lock is closed.

* * * * *